United States Patent [19]

Knoop

[11] Patent Number: 4,564,247
[45] Date of Patent: Jan. 14, 1986

[54] ROLLER-BEARING-MOUNTED TELESCOPIC TRACK FOR DRAWERS OR THE LIKE

[76] Inventor: Franz-Josef Knoop, Sonnenhang 7, D-4793 Büren-Steinhausen, Fed. Rep. of Germany

[21] Appl. No.: 558,918
[22] Filed: Dec. 7, 1983

[30] Foreign Application Priority Data

Dec. 7, 1982 [DE] Fed. Rep. of Germany ....... 3245209

[51] Int. Cl.⁴ .............................................. A47B 88/10
[52] U.S. Cl. ................................. 308/3.8; 312/341 R
[58] Field of Search ................ 308/3 R, 3 A, 3.6, 3.8, 308/6 R; 312/330 R, 334, 337–340, 341 R, 350; 248/429, 430

[56] References Cited

U.S. PATENT DOCUMENTS

| | | | |
|---|---|---|---|
| 2,201,477 | 5/1940 | Chamberlin | 384/215 X |
| 3,205,025 | 9/1965 | Jordan | 308/3.8 |
| 3,355,232 | 11/1967 | Blake | 312/338 X |
| 3,485,539 | 12/1969 | Fall et al. | 312/339 X |
| 4,112,534 | 9/1978 | Hagen | 312/341 R X |

FOREIGN PATENT DOCUMENTS 1938030 1/1971 Fed. Rep. of Germany .
2366241 9/1982 Fed. Rep. of Germany .

Primary Examiner—Stuart S. Levy
Assistant Examiner—David Werner
Attorney, Agent, or Firm—Krass and Young

[57] ABSTRACT

Roller-bearing-mounted telescopic track for drawers or the like, in which at least one inner track (4) is supported movably in an outer track (2). For this the inner track (4) is preferably constructed in such a way that the two rolling paths (2) directed outward are joined together by a web of an elastic material, preferably rubber. Thereby on one hand a damping of the running noises will be achieved. On the other hand, when there is imprecision of dimensions in the drawer or the cabinet receiving this, stresses between the tracks, which impair the rolling properties, are avoided, since the rolling paths can adapt to these imprecise dimensions within a certain range.

7 Claims, 11 Drawing Figures

ROLLER-BEARING-MOUNTED TELESCOPIC TRACK FOR DRAWERS OR THE LIKE

TECHNICAL FIELD

The invention relates to a telescopic track of the type which serve for the slidable mounting of drawers, industrial modules and the like in corresponding cases or cabinets.

BACKGROUND

In their simplest design such telescopic tracks consist of two single tracks of about the same length, the first of which is fastened onto the cabinet and the second onto the drawer. The second single track is mounted to be slidable with respect to the first single track by way of bearings, for example balls or rollers. The pulled-out length of such telescopic tracks is generally shorter than the length of the single tracks, since a part of the moving track must overlap the fixed track even in the pulled-out state to receive the moment of force arising from the weight of the drawer. In order to be able to pull a drawer completely out of the cabinet in which it belongs, double telescopic tracks are used with which for example a movable inner track is mounted in an outer track fixed in the cabinet and an outer track joined to the drawer is in turn mounted on this inner track. Thereby the pulled-out path can be doubled as compared with a single telescopic track. There have already been telescopic tracks known of the type of this class, in which the single tracks are respectively constructed as metal sections which are cold drawn or shaped from sheet metal (German Pat. No. 2,366,241).

A disadvantage of such telescopic tracks is that they are noisy in operation, since on the one hand the simple and not too precise construction of the tracks contributes to generating this kind of noise and since on the other hand, by reason of the intimate contact of all metal parts with one another, there is a barely damped transmission of the body sound to the sound-radiating surfaces of the cabinets or cases. Conversely, vibrations from the surroundings are transmitted by way of the tracks to the drawers and the articles located on them, for example technical apparatus. In particular, for the support of magnetic disk drives an extensive freedom from vibration is required for trouble-free operation. Therefore it is necessary wherever any transmission of vibration is undesirable to fasten the tracks respectively, by way of vibration-damping connecting parts, to the cabinet and/or the drawer. This on the one hand leads to an additional installation expense, especially when the places on which the rails are mounted are accessible only with difficulty. On the other hand the connecting parts generally reduce the possible width of the drawers by the installation dimensions of the connecting parts for a given size of the cabinet.

Another disadvantage is that a rigid fastening of the tracks to both the drawer and the cabinet wall necessitates a large adjusting and assembling expense because of the accuracy of dimensions to be adhered to, since any stress of the tracks against one another which would unfavorably affect the easy action properties must be avoided.

SUMMARY OF INVENTION

It is an object of the present invention to create a telescopic track in which the generation and conduction of operating noises and the transmission of vibrations to the surroundings can be kept low without the use of additional connecting parts; in which stresses and thus any worsening of the easy action properties of the drawers or cabinet are eliminated; and in which an easy installation is offered without any forfeiture of installation space for the drawers.

According to one aspect of the invention, the rolling paths of at least one track are provided with an elastic base which, by reason of the damping properties of the elastic base, reduces operating noise and the transmission of such noise to surrounding areas. The elastic mounting of the rolling paths also compensates for inaccuracies of dimensions between drawer and cabinet without the tracks being stressed against one another. As a further advantage, vibrations from the surroundings are kept away from the components supported by the tracks, e.g. magnetic disk drives.

The rolling paths may be fastened to a metal track part, for example, by way of more or less thick bases. In another arrangement of the invention however, the whole track body is formed as an elastic web carrying the roller paths. In this manner, a simple structural component results in which the number of critical joints between component parts made of different material is as small as possible.

The latter construction is particularly suited for the inner track. Specifically, the web is shaped approximately as a rectangle in cross section and the roller paths are arranged on the narrow sides of the rectangle where the web has the same width as the rolling paths.

The tracks can to a certain degree be adapted to the weights to be carried by a choice of the elastic properties of the web material. According to a further feature of the invention, a reinforcing plate or the like made of a material which is rigid as compared with the web is arranged on at least one side face of the elastic web. As a further feature of the invention, fastening for the track is provided on this reinforcing plate.

The invention can also be used with multiple telescopic tracks. For example, for the construction of a two-fold telescopic track, the rolling paths may respectively include two parallel running grooves. The inner track thus formed defines two parallel rolling path halves on each of which an outer track is guided, one of which is joined with the cabinet, the other with the drawer. The two running grooves do not touch, so that each of the sound-generating components is largely sound-isolated from all the others.

The rolling parts involved are, for example, balls or cylindrical rollers, and the rolling paths are conformed to the shape of the rolling part.

The material used for the base of the rolling paths or the elastic web is preferably rubber, while the rolling paths, the reinforcing plate, and the connecting means are preferably formed of a metal material. The metal parts are bonded to the rubber, preferably by vulcanization.

For fabricating the tracks with a track part consisting of elastic material, a process is provided according to the invention in which the rigid track parts, here the rolling paths, are laid in a device and are fixed in their exact mutual position by means of templates or the like, and the elastic material is brought into the free spaces provided and is joined by cementing or the like to the track parts.

The invention also provides a process for fabricating a track in which the rolling paths are fastened by elastic bases to a rigid central web. According to this process, the central web and the members defining the rolling paths are first fabricated as one rigid piece, the elastic material is joined to this rigid piece, and the connecting webs between the central web and the portions of the rigid piece forming the rolling paths are severed so that the portions of the rigid piece forming the rolling paths are then respectively joined only by way of the elastic bases.

Preferably the elastic material used is an elastomer such as rubber, and the material for the rigid track parts is metal. These materials are joined together by vulcanization in a vulcanization unit, in a preferred development of the fabrication procedure according to the invention.

Further advantages and features of the invention are seen from the claims, the drawings and the detailed description. A number of embodiments of the invention are represented in the drawings and described in the detailed description. In the drawings:

DETAILED DESCRIPTION OF THE PREFERRED EMBODIMENTS

Figure 1:
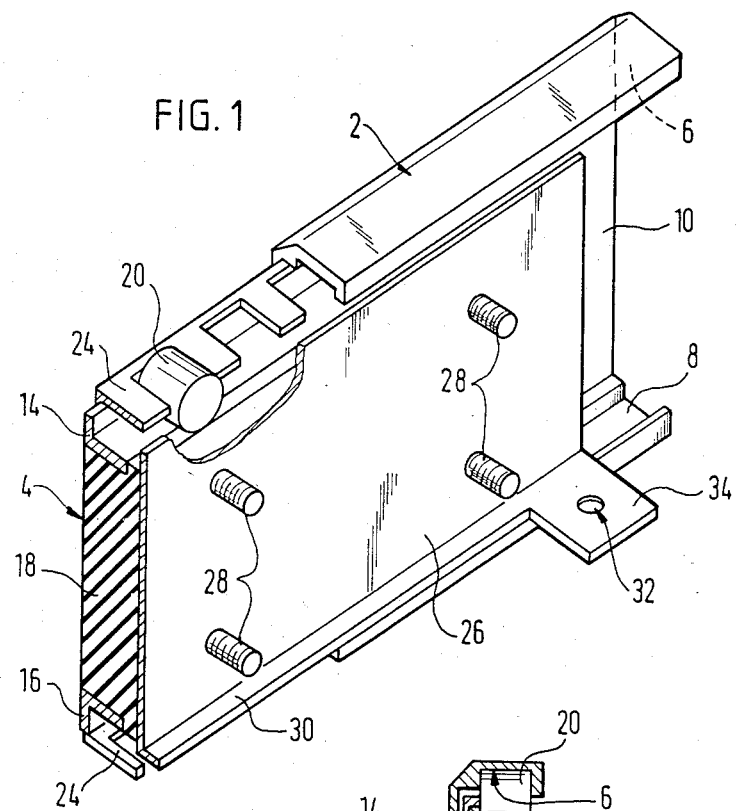
FIG. 1 in a perspective representation shows a single telescopic track with a track body of the inner track constructed as an elastic web.
Figure 2:
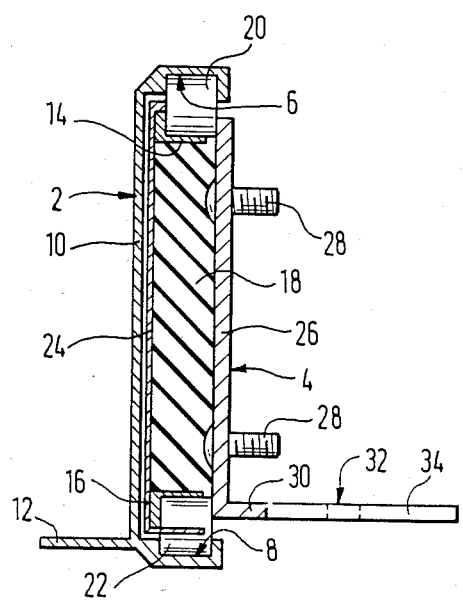
FIG. 2 shows a cross section through the arrangement according to FIG. 1.

The single telescopic track represented in FIGS. 1 and 2 consists essentially of an outer track 2 and an inner track 4 supported movably with respect to the latter. The outer track 2 includes upper and lower flange portions defining two oppositely aligned rolling paths 6,8. The upper and lower flange portions are integral with track main body portion 10. A fastening flange 12 is arranged on track main body portion 10 for fastening outer track 2 to the wall of a case or of a cabinet for example. The whole of the outer track may comprise, for example, a drawn extruded section.

Inner track 4 defines two rolling paths 14,16 which are respectively associated with rolling paths 6,8 on outer track 2. The main body 18 of inner track 4 is formed as an elastic web of rubber and paths 14,16 are respectively defined along the upper and lower edges of body 18. Cylindrical rollers 20,22 are respectively arranged between the rolling paths 6,14 and 8,16. Rollers 20,22 are retained and guided by a roller cage 24. A metal reinforcing plate 26 is secured, as by vulcanizing, to the right side, as viewed in FIGS. 1 and 2, of the track main body 18. Plate 26 serves to stiffen main body 18 and carries bolt means 28 for fastening inner track 4 to a drawer. A lower edge strip portion 30 of reinforcing plate 26, extending at a right angle to the main body of the plate, serves for attaching the drawer. Edge strip 30, at its right end as viewed in FIG. 1, is extended to form a fastening plate 34 provided with a bored hole 32.

Rolling paths 14,16 are each defined by an L-shaped metal strip with the bottom or horizontal portion of the strip forming the rolling surface proper and the side or vertical portion of the strip forming a lateral limit of the rolling path. The other lateral limit of the rolling paths is formed by the upper and lower projection of reinforcing plate 26 beyond the upper and lower edges of main body 18. Reinforcing plate 26 has no contact with the rolling paths 14,16, so that the running noises generated at the rolling paths are not transmitted to the reinforcing plate and are thus not transmitted to the associated drawer.

Figure 3:
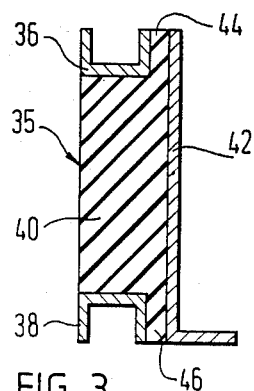
FIG. 3 shows a cross section through another embodiment of an inner track.

FIG. 3 shows an embodiment of an inner track 35 in which two rolling paths 36,38 are arranged in turn on a track main body 40 formed as an elastic web. The rolling paths 36,38 are each defined by a U-shaped metal strip secured respectively to the upper and lower edges of main body 40. A reinforcing plate 42 is arranged laterally on the elastic track main body 40 and has no contact with the rolling paths 36,38, but rather is separated from the latter respectively by a strip 44,46 of the elastic track body 40, so that running noises are kept away from the reinforcing plate and thus from the cabinet or the drawer to which the inner track 35 is fastened.

Figure 4:
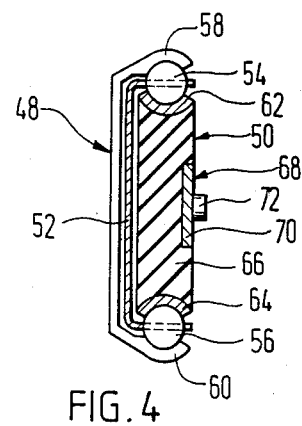
FIG. 4 shows a cross section through another embodiment of a single telescopic track.
Figure 5:
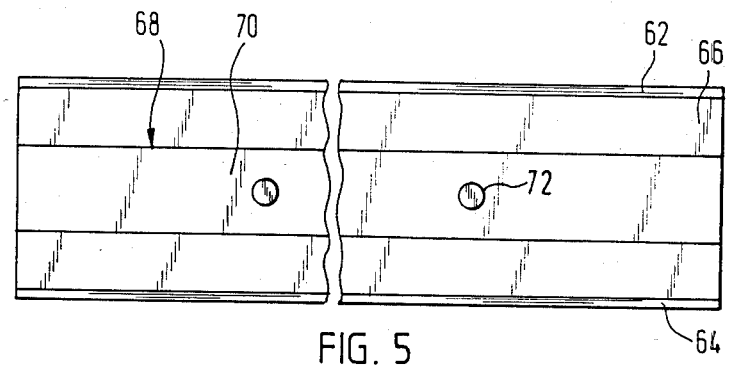
FIG. 5 shows an inner track according to FIG. 4.

FIGS. 4 and 5 show another embodiment of a single telescopic track in cross section, with an outer track 48, an inner track 50, and balls 54,56 arranged between the outer and the inner track and held and guided by a ball cage 52. The rolling paths 58,60 and 62,64 are arcuate in cross section. The main body 66 of inner track 50 is formed as an elastic web and arcuate paths 60,64 are defined by arcuate cross section metal strips secured respectively to the upper and lower edges of main body 66. Means 68 are provided on the right side, as viewed in FIG. 4, of track body 66 for fastening the inner track to a drawer or a cabinet wall. Means 68 consist of a metal plate 70 vulcanized into the web with a plurality of integral fastening bolts 72 for securing the track to a drawer or a cabinet wall.

Figure 6:
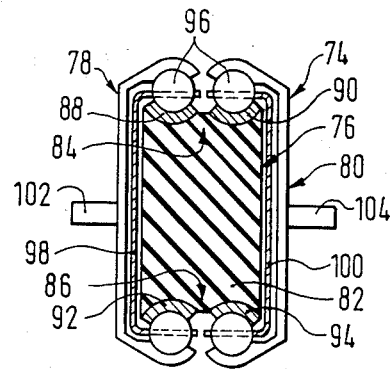
FIG. 6 shows a cross section through an inner track for a double telescopic track.

FIG. 6 shows a cross section of a double telescopic track 74 including an inner track 76 and two outer tracks 78,80. Outer tracks 78,80 correspond substantially to outer track 48 of FIG. 4. Inner track 76 comprises substantially a doubling of inner track 50 of FIG. 4. The track main body is formed as an elastic web 82. Rolling paths 84,86 are arranged on the track main body 82 and respectively include two parallel rolling grooves 88,90 and 92,94. Grooves 88,90 and 92,94 are defined by arcuate cross section metal strips secured side by side respectively to the upper and lower edges of main body 82. Rolling grooves 88,92 and 90,94 each form half of a rolling path. Outer tracks 78 and 80 are respectively guided on these two halves of a rolling path. Balls 96 are guided by ball races 98 and 100 respectively. The rolling grooves do not touch, so that the running noises generated respectively in one half of a rolling path are not transmitted further. Each of the outer tracks 78,80 carries means 102,104 for fastening to a cabinet wall or a drawer.

Figure 7:
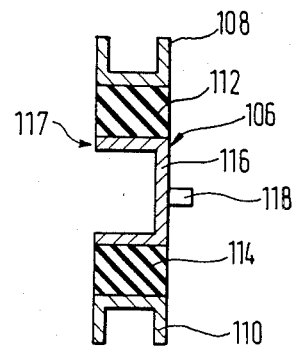
FIG. 7 shows a cross section through an inner track with an elastic base between the track body and the rolling paths.

The inner track 106 represented in FIG. 7 shows a construction different from the embodiments previously described. U-shaped metal strips 108,110 defining the upper and lower rolling paths are respectively fastened to elastic bases 112,114 which are in turn fastened to the upper and lower faces of a U-shaped central metal web 116. Central web 116 and bases 112,144 form the track main body 117. Central web 116 includes means 118 for fastening inner track 106 to a drawer or a cabinet wall.

Figure 8:
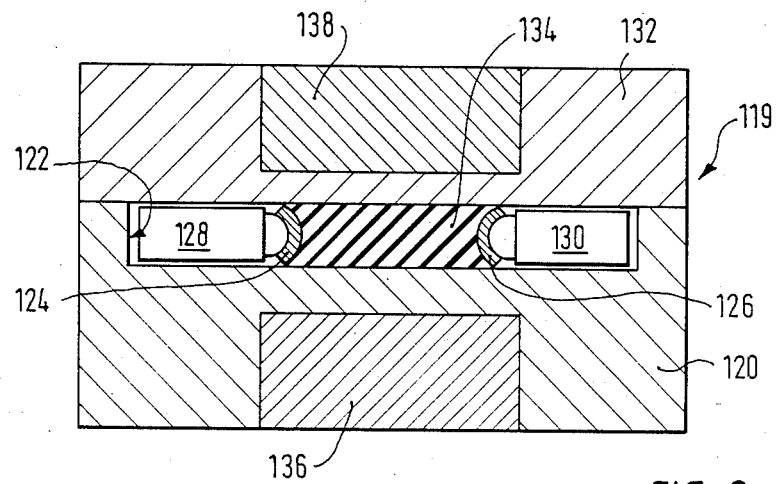
FIG. 8 diagrammatically shows a device for fabricating an inner track according to FIG. 4.

FIG. 8 diagrammatically shows a device 119 for producing an inner track of the general type seen in FIG. 4. Device 119 consists of a mold 120 having a top opening 122. Arcuate metal strips 124,126 defining the rolling paths are placed in opening 122 and fixed in their exact position by means of laterally adjustable templates 128,130. The mold opening 122 can be covered over by a force plug 132.

After the metal strips 124,126 are positioned in mold openings 122, a raw rubber mat is laid in the mold opening 122, the volume of which mat corresponds to the volume of the subsequent track body 134. Both the mold 120 and the force plug 132 have heatable inserts 136 and 138. For example, the mold 120 and the force plug 132 may be made of steel and the heatable inserts 136 and 138 may be made of aluminum. Through the placing of the heated force plug 132 on the heated mold 120, the raw rubber mat becomes liquid and flows between the metal strips 124,126, where the rubber becomes bonded with the strips by a vulcanization process. If a reinforcing plate of the type seen in FIG. 3 or a fastening means of the type seen in FIG. 4 is to be attached to track main body 134, these are placed in the mold 120 before the vulcanization process and the mold is specifically constructed to receive these parts. After the vulcanization operation, the force plug 132 is lifted off and the finished track removed.

Figure 9:
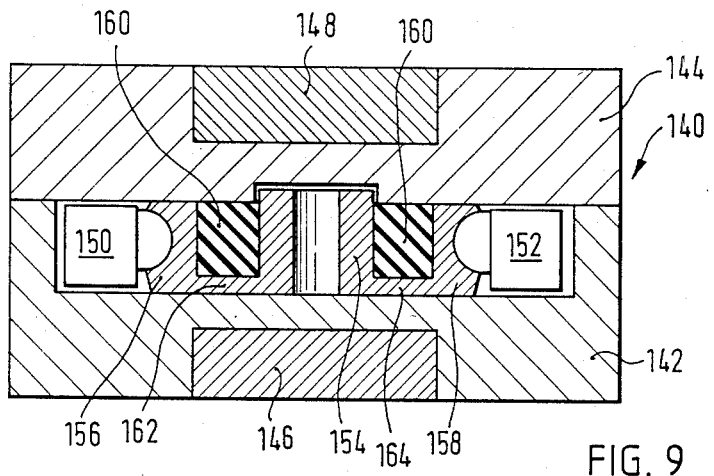
FIG. 9 diagrammatically shows another device for fabricating a track according to FIG. 10.

FIG. 9 shows a device 140 for producing a track 141. Device 140 includes mold 142 and a force plug 144, both of which are equipped with heatable inserts 146,148. Templates 150,152 serve to position a unitary part in the mold comprising a central portion 154 and outer flange portions defining rolling paths 156,158. The rubber material forming the bases 160,161 is applied to the structural component in the form of rubber mats for example, liquified by means of the force plug 144 placed on it and forced into the spaces provided.

Figure 10:
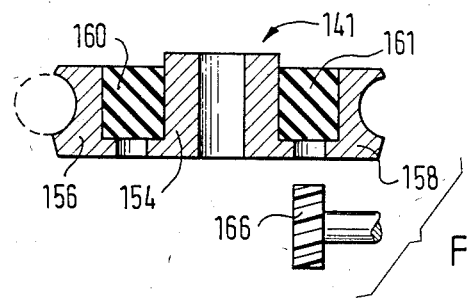
FIG. 10 shows a track with a rigid central web and rolling paths joined with it by way of elastic bases.

The structural component thus fabricated is then taken out of the mold. In a separate device the connecting webs 162,164 between the central portion 154 and the rolling paths are severed by cutting saws 166, as is seen in FIG. 10. The flange portions forming rolling paths 156,158 and the central portion 154 are thus connected only by the vibration-damping bases 160,161.

Figure 11:
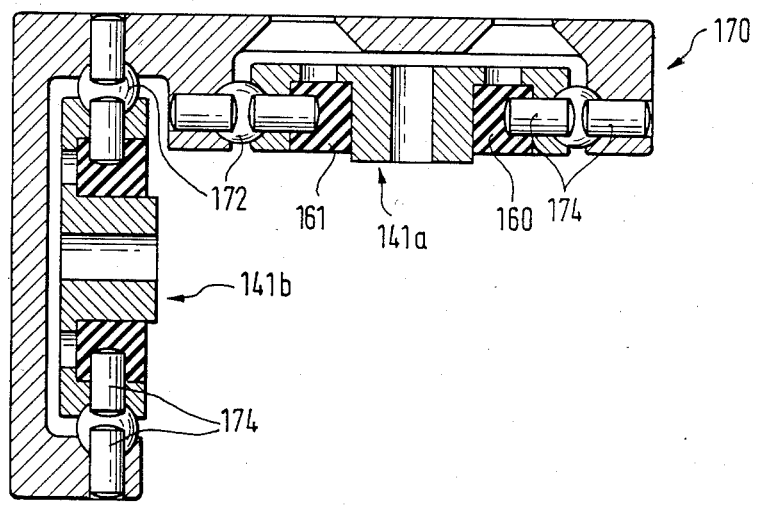
FIG. 11 shows an installation example for a track according to FIG. 10.

FIG. 11 shows a track installation employing tracks of the type seen in FIG. 10. An angle track 170 forms two outer tracks at an angle to one another in which two inner tracks 141a and 141b of the type seen in FIG. 10 are supported movably. The space remaining between the rolling paths of the outer tracks and of the inner tracks receives the balls 172. Respective stop pins 174 arranged on the track ends serve for limiting the pull-out path of the tracks. The arrangement shown permits precise, stress-free guiding and ensures extensive vibration damping between the outer and inner tracks.

I claim:

1. A telescopic track for drawers or the like of the type including at least one outer track member including means defining two confronting rolling paths, at least one inner track member including means defining two rolling paths respectively confronting the rolling paths on said outer track; and bearing means interposed between the respective pairs of confronting rolling paths, characterized in that at least one of said track members is a composite structure including a central main body portion formed of an elastomeric material and strips of rigid non-elastomeric material bonded to the upper and lower edge surfaces of said elastomeric main body portion to define said rolling paths thereon so that said elastomeric main body portion dampens and absorbs the running noises and vibrations generated along said paths during operation of the track; a plate of rigid non-elastomeric material is bonded to a side surface of said elastomeric main body portion for fastening the track to a drawer or cabinet; and said plate is isolated from said strips by said elastomeric main body portion so that the running noises and vibrations generated on said paths is not transmitted to the drawer or cabinet.

2. Telescopic track as claimed in claim 1, characterized in that said one track member is said inner track member and said main body elastomeric portion is rectangular in cross section with said rolling paths (14, 16; 36,38; 62,64; 84, 86) arranged on the narrow upper and lower edge surfaces of the rectangle.

3. Telescopic track as claimed in claim 1, characterized in that the rolling paths (84,86) respectively include two parallel running grooves (88,90; 92,94) and that an outer track (78,80) is guided on each of the halves of a rolling path thus formed.

4. Telescopic track as claimed in claim 1, characterized in that said rolling paths (62,64; 88, 90; 92,94 or respectively 36,38; 108,110) are arcuate in cross section and said bearing means comprise balls (54,56;96) rollably guiding along said arcuate paths.

5. Telescopic track as claimed in claim 1, characterized in that said strips (14, 16) are L-shaped in cross section with a horizontal portion defining the respective rolling paths and a vertical portion defining one lateral limit of the respective rolling path and said bearing means comprise cylindrical rollers (20,22) rollably guiding along said horizontal strip portions.

6. A telescopic track for drawers or the like of the type including at least one outer track member including means defining two confronting rolling paths, at least one inner track member including means defining two rolling paths respectively confronting the rolling paths on said outer track, and bearing means interposed between the respective pairs of confronting rolling paths, characterized in that at least one of said track members is a composite structure including a central main body portion formed of an elastomeric material and strips of rigid non-elastomeric material bonded to opposite surfaces of said elastomeric material to define said rolling paths thereon so that said elastomeric main body portion dampens and absorbs the running noises and vibrations generated along said paths during operation of the track; said strips are secured to the upper and lower edge surfaces of said main body portion and are L-shaped in cross section with a horizontal portion defining the respective rolling path and a vertical portion defining one lateral limit of the respective rolling path; said bearing means comprise cylindrical rollers rollably guiding along said horizontal strip portions;

and a reinforcing plate is secured to a side face of said elastomeric main body portion with the plate projecting above and below the upper and lower edge surfaces of said elastomeric main body portion to respectively define the other lateral limit of the rolling paths.

7. Telescopic track as claimed in claim 6, characterized in that the track main body portion is formed by a central web (116,165) made of a rigid material with strips (112,114; 160,161) of elastomeric material secured to the upper and lower faces of said rigid central web.

* * * * *